United States Patent [19]

Anderson

[11] 4,272,923

[45] Jun. 16, 1981

[54] VEHICLE DOOR

[75] Inventor: Bruce H. Anderson, Centerport, N.Y.

[73] Assignee: ComCoach Corporation, Ronkonkoma, N.Y.

[21] Appl. No.: 59,567

[22] Filed: Jul. 20, 1979

Related U.S. Application Data

[63] Continuation-in-part of Ser. No. 932,942, Aug. 11, 1978, abandoned.

[51] Int. Cl.³ ............................................. E05F 11/00
[52] U.S. Cl. ................................. 49/360; 16/94 R; 49/404; 49/425; 49/426
[58] Field of Search ................. 49/360, 404, 372, 425, 49/426, 427, 410, 411; 16/93 R, 94 R, 87 R

[56] References Cited

U.S. PATENT DOCUMENTS

| 950,089 | 2/1910 | Barth | 49/410 X |
|---|---|---|---|
| 1,000,551 | 8/1911 | Pickett | 49/426 X |
| 1,027,156 | 5/1912 | Rumsey | 49/410 |
| 1,067,678 | 7/1913 | Prim | 16/93 R |
| 1,225,098 | 5/1917 | Addison | 49/410 X |
| 2,485,296 | 10/1949 | Lescaze | 49/411 X |
| 2,570,563 | 10/1951 | Kreimendahl | 49/216 X |
| 2,656,215 | 10/1953 | Harvey | 49/411 |
| 3,169,574 | 2/1965 | Behlen | 49/426 X |
| 3,378,952 | 4/1968 | Bidelman et al. | 49/360 |
| 3,727,349 | 4/1973 | Bainbridge | 49/411 |
| 3,802,126 | 4/1974 | Markus | 49/360 |
| 3,842,462 | 10/1974 | Bainbridge | 49/409 X |
| 3,857,197 | 12/1974 | Reddy et al. | 49/360 X |
| 4,073,034 | 2/1978 | Martens | 16/87 R X |

FOREIGN PATENT DOCUMENTS

| 390511 | 8/1965 | Switzerland | 49/425 |
|---|---|---|---|
| 791063 | 2/1958 | United Kingdom | 49/426 |

*Primary Examiner*—Philip C. Kannan
*Attorney, Agent, or Firm*—Cantor and Singer

[57] ABSTRACT

A mass transit vehicle having a sliding door, the sliding door being mounted at its lower end, by means of a rider, on a linear bearing rod extending outwardly from a bracket mounted on the lower vehicle frame. At its upper end, the door is guided, through a rider, by a linear bearing rod suspended from a bracket which is mounted to the upper vehicle frame.

25 Claims, 17 Drawing Figures

VEHICLE DOOR

CROSS-REFERENCE TO RELATED APPLICATION

This application is a Continuation-in-Part of my co-pending application Ser. No. 932,942, filed Aug. 11, 1978 now abandoned.

TECHNICAL FIELD

This invention relates to doors, and more particularly this invention relates to a sliding door for a mass transit vehicle such as a bus.

BACKGROUND OF THE INVENTION

There are presently in use a variety of mass transport vehicles which are commonly acknowledged as being energy efficient and relatively inexpensive to operate and maintain. These mass transport vehicles can be considered to fall within two general categories, namely, trains and buses. Trains include long distance passenger trains as well as commuter trains and subways. Buses include such vehicles as executive transport vehicles, school buses, intra- or inter-city buses, vehicles used at airports or train terminals for transporting travelers from one terminal to another or for transporting travelers from a remote part of an airport to a passenger terminal, vehicles used to transport travelers from an airport or train terminal to motels and hotels, vehicles used to transport travelers from a city terminal to a remote airport, and vehicles used at airports for transporting passengers to auto rental facilities located at a distance from the terminal.

The most obvious common feature of all mass transport vehicles, regardless of type or size, is that they include a body enclosing the passenger carrying compartment and means for entering and leaving the vehicle, the last mentioned means being one or more doorways. The problems encountered with the design and operation of the doors in mass transit vehicles are common to all types of vehicles, whether trains or buses, whether small or large. For ease in the following description, reference will be made to buses in particular although it will be immediately recognized by one skilled in the art that such reference to buses is illustrative only and is equally applicable to any suitable type of mass transit vehicle.

In designing such buses, consideration must be given to the fact that the passengers may be entering and leaving the bus with hand luggage and a particularly wide door is necessary. Similarly, the passenger carrying hand luggage will be somewhat awkward in entering and leaving the bus and safety factors, therefore, must be considered. Most of the buses in common use utilize a so-called bi-fold door which is essentially a door having two panels which are hingedly joined to each other as well as being hingedly mounted on the body of the bus so that when the door is opened, it folds back upon itself. Some buses utilize a so-called double bi-fold door which is merely two bi-fold doors opening to opposite sides of the door opening.

There are several disadvantages associated with bi-fold doors in buses of this type. The main disadvantage is the tendency of the doors to stick due to the fact that the bodies of the vehicles have a variety of stresses applied to them as they travel on roughly paved surfaces and as the weight distribution shifts when passengers enter and leave the vehicle. These stresses and the shifting weight cause the body of the vehicle to flex and, thereby, cause misalignment of the doors with the tracks and associated mechanism.

DISCLOSURE OF INVENTION

It is, therefore, the primary object of the present invention to provide a door for a passenger carrying vehicle which is free of the aforementioned and other such disadvantages.

It is another object of the present invention to provide a sliding door for a passenger carrying vehicle which is simple of construction and reliable in use.

It is a further object of the present invention to provide a sliding door for a passenger carrying vehicle which is resistant to binding, sticking, or jamming.

It is yet another object of the present invention to provide a mounting system for a sliding door in a passenger carrying vehicle which is tolerant of deflections and other stresses caused by over-the-road vehicular operations.

It is still a further object of the present invention to provide a passenger carrying vehicle having a sliding door consistent with the foregoing objects.

Consistent with these objects, the present invention, in its most significant aspect, comprises a sliding door which is mounted on a lower bearing rod which carries most of the weight of the door and an upper bearing rod which is primarily a guide. The upper bearing rod is mounted on supporting blocks which are suspended from the top frame of the vehicle while the lower bearing rod is mounted on supporting blocks extending outwardly from a bracket on the lower frame of the vehicle. Furthermore, the upper supporting blocks are flexibly mounted to allow for minor rod deflections.

In preferred embodiments, a brake interlock system is used to preclude the possibility of the door accidentally opening. Furthermore, the leading edge of the door, in a preferred embodiment, is equipped with a sensing edge to reverse door travel direction in the event the sensitive edge is contacted when the door is closing. At the present time the preferred operating mechanism for opening and closing the door is a pneumatic system, although any known means for causing selective reciprocal movement of the door may be used.

There are three preferred alternate embodiments for the bearing system used to mount the door on the bearing rod. The first is a C-shaped linear motion ball bearing bushing which rides on the bearing rod. The second is a similar linear motion ball bearing bushing, but of a closed type which completely encircles the bearing rod. The third is a series of wheels, similar in appearance to pulleys, which are mounted on sealed bearings and ride on the bearing rod.

BRIEF DESCRIPTION OF DRAWINGS

This invention will be better understood and objects other than those set forth above will become apparent when consideration is given to the following detailed description thereof. Such description makes reference to the annexed drawings, where like reference characters refer to like parts throughout the several views of the drawings, and wherein.

BEST MODE FOR CARRYING OUT THE INVENTION

As has already been mentioned, the present invention applies to a variety of mass transit vehicles such as trains, vehicles commonly called vans, and those vehicles commonly called buses which are somewhat larger than the vans. In this detailed description of the invention, reference is had, for exemplary purposes only and not in a limiting sense, to a particular type of bus commonly used at airports which utilizes a basic vehicle known as the GMC "Transmode" which is purchased complete with chassis, body, and running gear, but in an unfinished form. The interior is then fitted out for carrying passengers and door means are installed. This invention can be used equally well in vehicles made by other manufacturers.

Figure 1:
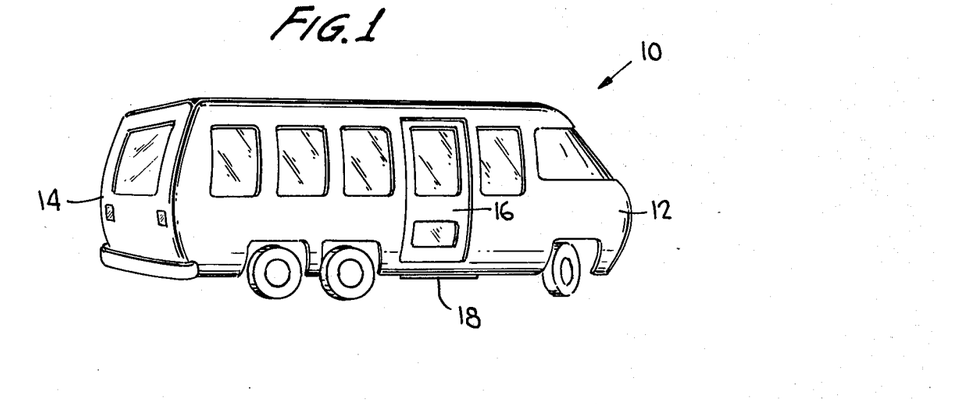
FIG. 1 is a perspective view of an airport bus showing the location of the inventive door.

Referring first to FIG. 1, there is shown a typical airport bus generally designated by the numeral 10 having a front end portion 12 and a rear end portion 14. A single sliding door 16 is provided such that it moves forwardly when opening. Stair well 18 allows for convenience in entering and leaving the bus.

Figure 2:
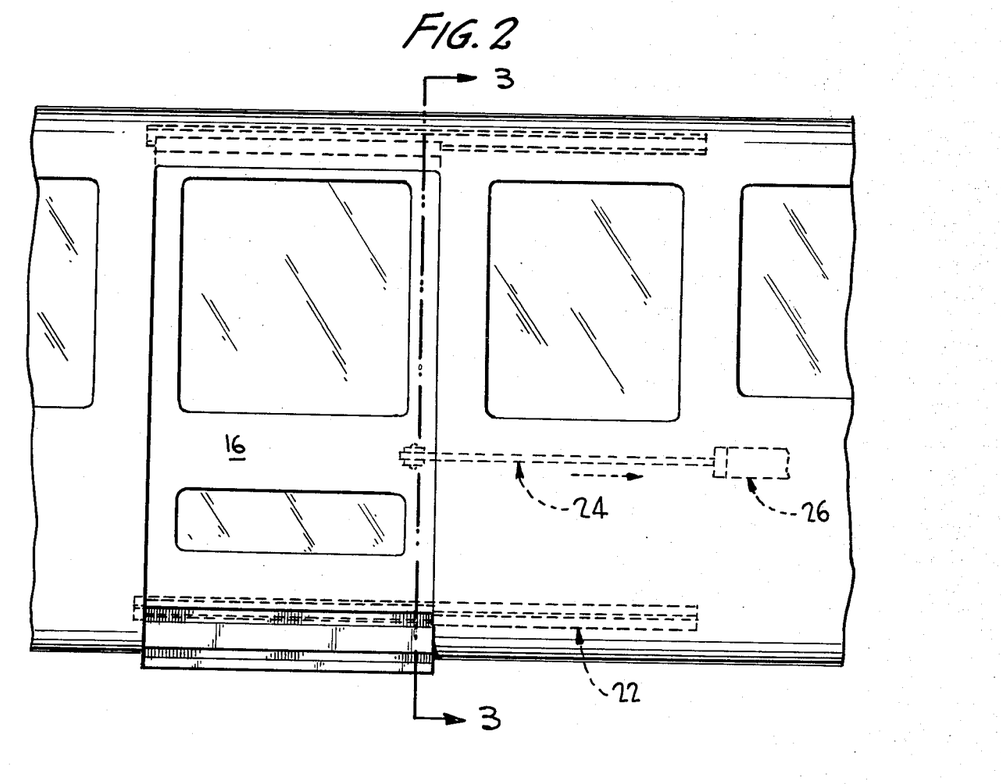
FIG. 2 is a side elevational view of the bus of FIG. 1 partially in phantom and partially broken away for illustrative clarity.

As will be seen from FIG. 2, door 16 is suspended at the top from upper rail 20 and at the bottom from lower rail 22. Movement of the door to its forward, open, position and to its rearward, closed, position is through linkage means 24 and pneumatic actuating means 26 which will be more fully described hereinbelow.

Figure 3:
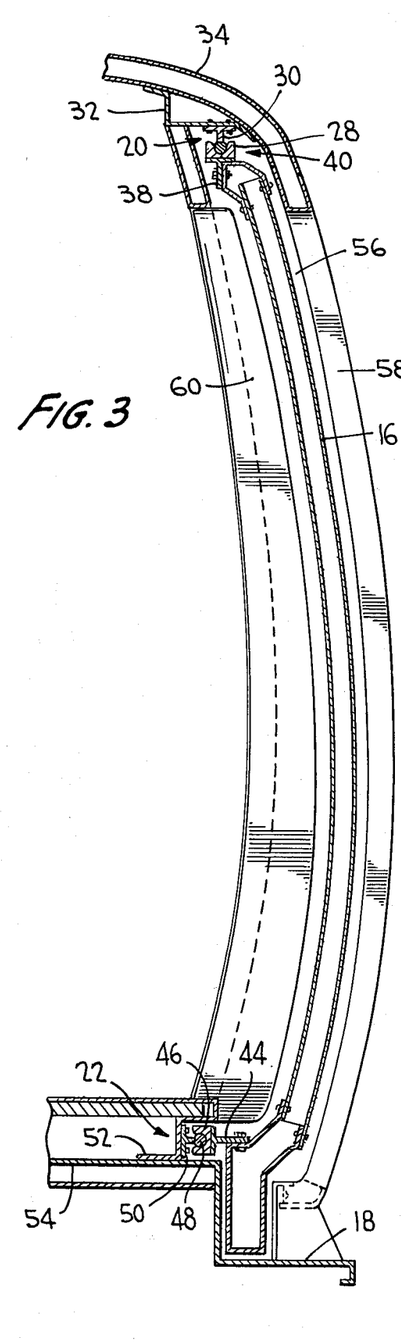
FIG. 3 is a sectional view taken on the line 3—3 of FIG. 2.

Turning now to FIG. 3, as has already been described, door 16 is supported by, and rides on, upper track 20 and lower track 22. Upper track 20 comprises linear bearing means 28 mounted on a plurality of suspending T-shaped brackets 30 which, in turn, are mounted on upper track support 32. Upper track support 32 is fixed to the upper portion of the frame of the bus 34. The upper portion of door 16 is attached to bracket 38. Fixed to bracket 38 are a plurality of ball bushing assemblies 40. It will be seen that brackets 30 are mounted in a horizontal plane, that is, the base of the brackets 30 is horizontal, while the depending portion to which bearing means 28 is attached is vertical. Linear bearing means 28 is an elongated polished steel rod which is circular in cross-section.

The lower end of door 16 is fixed to bracket 44 to which is attached a plurality of ball bushing assemblies 46 which ride on linear bearing 48 which is identical to linear bearing 28. Linear bearing 48 is fixed to brackets 50 which, in turn, are fixed to lower support 52. Lower support 52 is fixed by suitable means such as welding to the lower frame of the bus 54. It will be seen that T-shaped lower brackets 50 are mounted with their bases in a vertical plane so that the leg of the T-shaped bracket extends horizontally outwardly. Door 16 slides in pocket 56 between outer wall 58 and inner wall 60 of the bus.

Figures 4, 5:
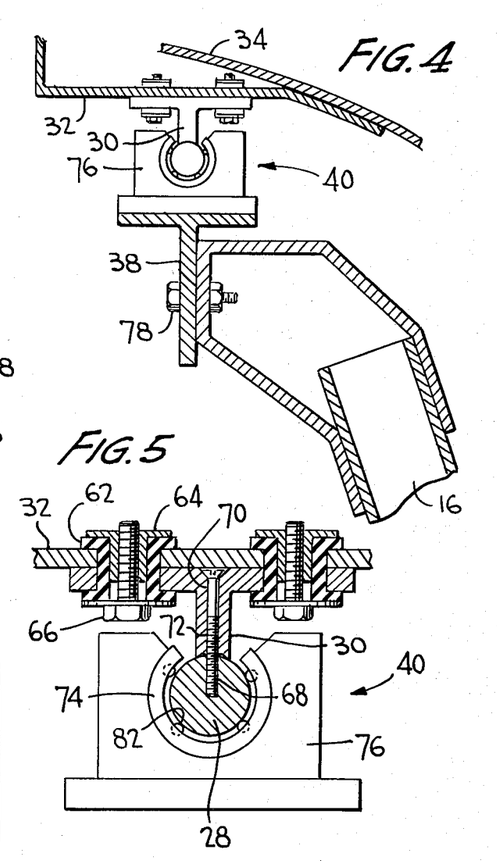
FIG. 4 is a sectional view of the upper mounting of the door of FIG. 3 in slightly enlarged scale.
FIG. 5 is a sectional view of the upper mounting of FIG. 4 in somewhat greater enlarged scale.

For a better understanding of the mounting of the door to the bus, reference is had to FIGS. 4 and 5 which show the upper mount in greater detail, it being appreciated by one skilled in the art that the lower mount is similar. Support 32 is fixed to the upper framework of the bus 34 by any suitable means such as welding. It is preferred that support 32 be a single length of any suitable material such as steel. A plurality of brackets 30 are fixed to support 32 by means of resilient bushings 62 having threaded metal inserts 64 into which are screwed bolts 66 thereby providing a strong yet resilient, mounting for bracket 30. Linear bearing 28 is a length of circular rod made of any suitable bearing material such as a highly polished steel. A hole 68 is bored and tapped in bearing 28 at a location corresponding to each bracket 30. Similarly, a hole 70 is bored in each bracket 30 and countersunk. A bolt 72 is then used to attach bearing 28 to each support 30. There are preferably from four to six brackets 30, depending on the length of bearing 28, with one at each end and the others equally spaced along the length of bearing 28, as partially shown in FIG. 6.

Riding on bearing 28 are a plurality of ball bushings 74 which, together with bushing mounting blocks 76 make up ball bushing assembly 40. Bushing mounting block 76 is fixed to bracket 38 by any suitable means such as screws (not shown). Brackets 38 are, in turn, fixed, as by bolts 78, to door 16.

Figures 6, 17:
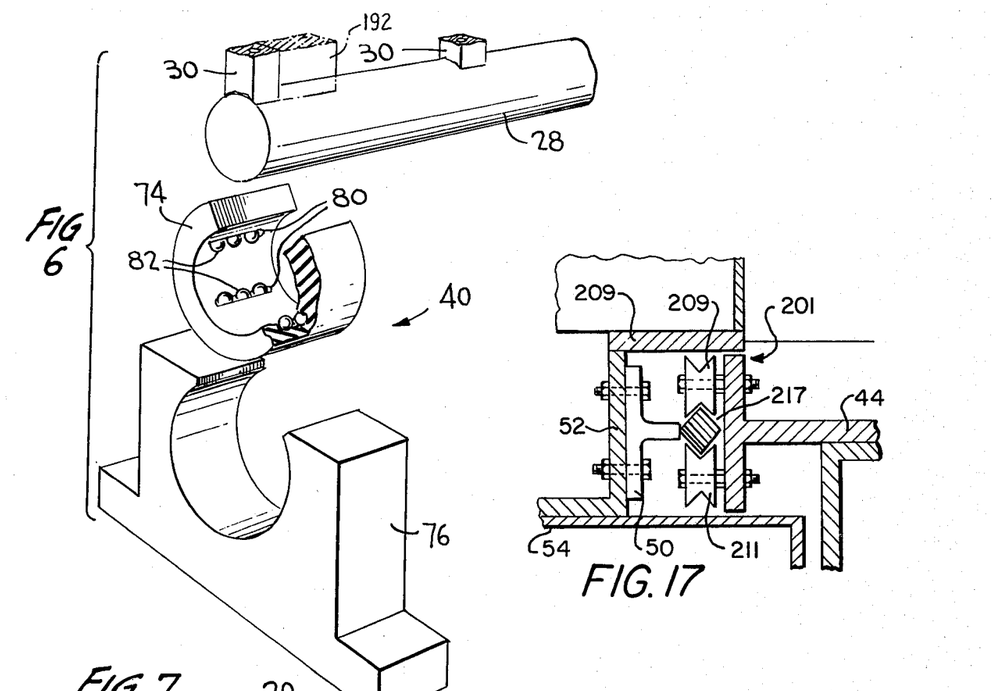
FIG. 6 is an exploded perspective view, partly in section, of a bushing used in the upper mounting of one embodiment.
FIG. 17 is a sectional view of the lower mounting corresponding to the embodiment of FIG. 16.

Considering both FIGS. 5 and 6, ball bushing 74 is C-shaped and comprises a suitable hard resilient material such as rubber with a plurality of channels 80 which have, freely riding therewithin, a plurality of ball bearings 82. Bushing 74 is securely held in mounting block 76. It will be appreciated that by using a split bushing, the potential problem of the ball bushing moving past brackets 30 is solved.

Figure 7:
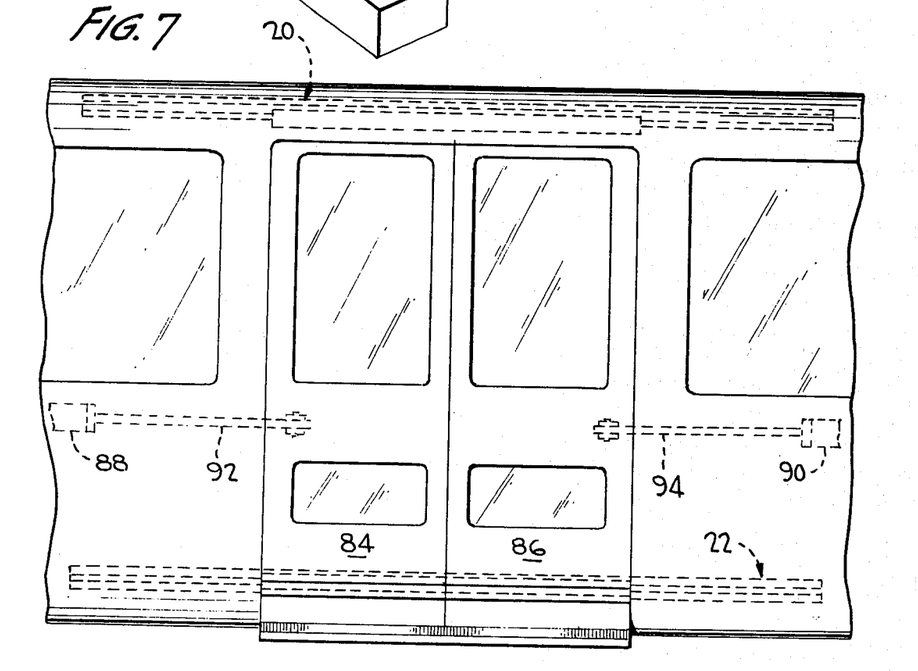
FIG. 7 is a side elevational view of an alternate embodiment, partially broken away for illustrative clarity.

FIG. 7 shows an alternate embodiment using a pair of sliding doors 84 and 86 which are shown in the closed position. When opened by means of pneumatic cylinders 88 and 90, and pistons 92 and 94, respectively, the doors slide in opposite directions into pockets provided therefor. The same mounting system is used as in the preferred single door embodiment of FIG. 2 wherein the doors ride on upper rail 20 and lower rail 22.

Returning to FIG. 3, it will be appreciated that, due to the positioning of the upper and lower rails 20 and 22, and the way the ball bushing assemblies 40 and 46 are suspended therefrom, the door actually primarily rides on the lower suspension while the upper suspension primarily serves as a guide, which is directly opposite the way prior art sliding door mounting arrangements work.

Figure 8:
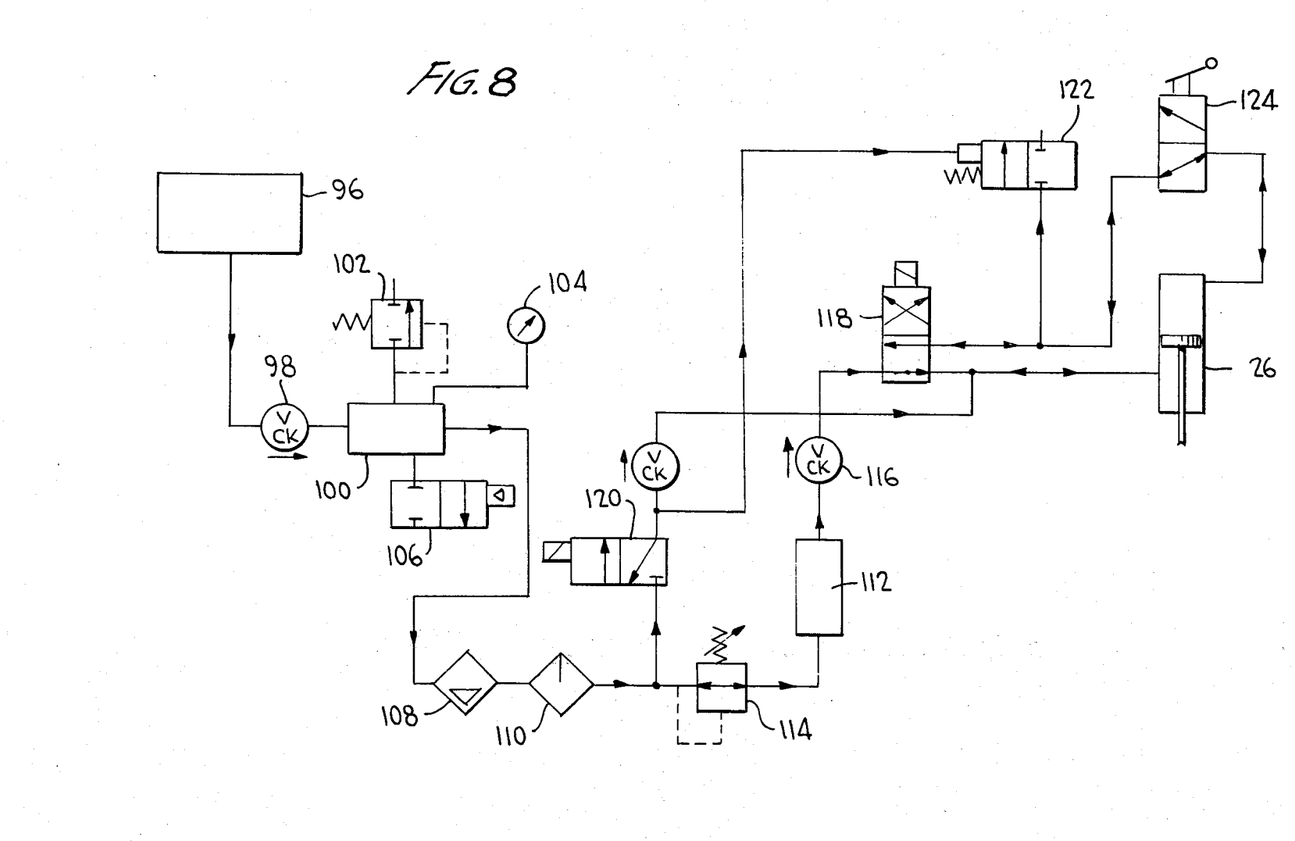
FIG. 8 is a schematic diagram of the pneumatic control system for the sliding door of the instant invention.

Turning now to FIG. 8, there is depicted schematically the pneumatic system for operating the door of FIG. 2. It is initially pointed out that all the components are commercially available and are well-known in the art. Accordingly, any detailed description of the individual components is not necessary. Free air is compressed in air compressor 96 which is a standard 12 volt air compressor having a capacity of 28.32 liters (one cubic foot) per minute at 6.8 Atm. (100 PSI). After passing through unloader check valve 98, the air is stored in air compressor tank 100. Air compressor tank 100 is fitted with pressure relief valve 102, pressure gauge 104 and automatic drain valve 106. The air is then passed through automatic drain filter 108 and automatic drain lubricator 110 to reservoir 112 where it is stored at an operating pressure somewhat lower than the pressure in air compressor tank 100 after passing through pressure regulator 114. Air pressure regulator 114 is set at a pressure corresponding to the desired speed of door opening or closing, such setting being apparent to one skilled in the art.

The regulated air for actuating pneumatic cylinder 26 passes through check valve 116 and solenoid valve 118. Solenoid valve 118 is a four way-two position double solenoid momentary contact maintained position valve which operates on a standard 12 volt electrical source.

If the door is cycled to the "open" position by the sensing edge or the "emergency door open" switch, valve 120 directs high pressure air to the rod end of cylinder 26 and quick exhaust valve 122 opens to the atmosphere to minimize the time required for the door to change direction. Valve 120 is a three way-two position solenoid maintained contact-spring return solenoid valve.

Emergency door control valve 124 is manually actuated for emergency door operation. By exhausting the head end of cylinder 26 to the atmosphere, system pressure will open the door if valve 118 is in the "open" position. If valve 118 is jammed in the "closed" position, the door may be manually pushed open.

Figure 9:
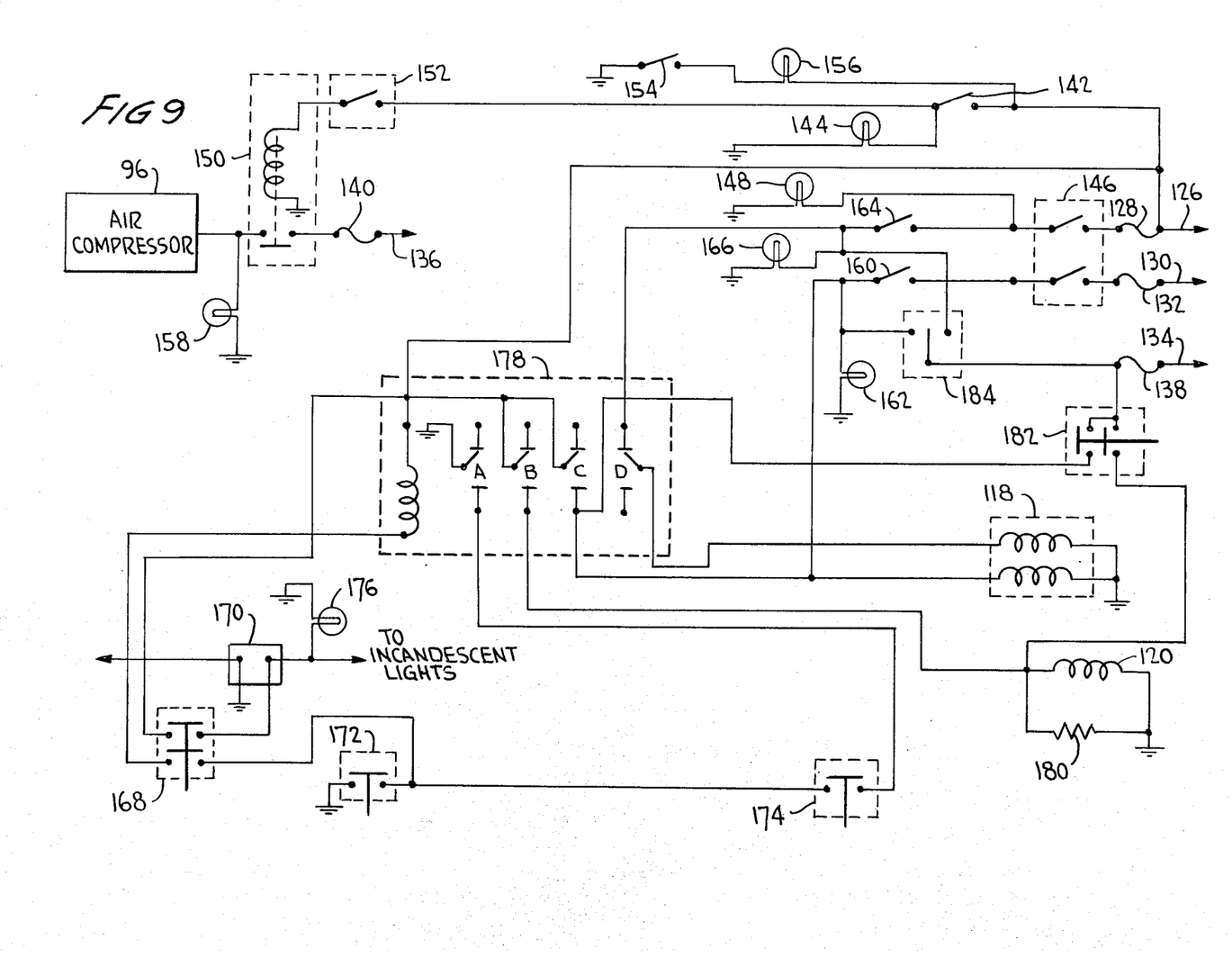
FIG. 9 is a schematic diagram of the electrical system.

The actual operation of the inventive door system will be better understood when consideration is given to the schematic diagram of the electrical system depicted in FIG. 9. Power to the electrical system is derived from four sources. First, power line 126 is connected to the "accessory" side of the vehicle ignition switch and is controlled by fuse 128. Second, power line 130 is connected to the switched side of the stop light switch and is controlled by fuse 132. If the vehicle stop light switch grounds the circuit, an additional relay will be required as will be apparent to one skilled in the art. Power line 134 is connected to the battery side of the vehicle starter solenoid as is power line 136. Power lines 134 and 136 are controlled by fuse 138 and circuit breaker 140, respectively.

In operation, the operator of the vehicle first closes switch 142 to start compressor 96. Pilot light 144 indicates that switch 142 is on. Next, door master switch 146 is switched on and pilot light 148 lights to indicate this. It should be noted that when switch 142 is on, power is provided to air compressor solenoid 150 through air pressure control 152. If air pressure in the main tank 100 drops below 4.08 Atm. (60 PSI), low pressure switch 154 located on tank 100 closes and causes pilot light 156 to light thereby warning the operator. Pilot light 158 cycles on and off to indicate when the compressor is running.

In order to open the door, the driver must have the brake pedal depressed since the stop lights must be on to energize the door open switch 160 which is a single pole single throw momentary contact push switch. When door open switch 160 is pushed, pilot light 162 which is integral with switch 160 momentarily lights. Momentary power through switch 160 to the coil of valve 118 maintains the valve in the open position.

The close cycle is similar to the open cycle. Power for the door switch 160 comes from the stop light switch. On the other hand, power for the door close switch 164 comes from the ignition switch whenever the vehicle key switch is in the "ignition" or "accessory" position. Door close switch 164 is also a single pole, single throw momentary contact push switch. When door close switch 164 is pushed, pilot light 166 which is integral therewith momentarily lights. In a manner similar to the open cycle, momentary power through switch 164 to the coil of valve 118 maintains the valve in the close position. When the door opens, it trips limit switch 168 which causes the inside ceiling lights and the door step lights to go on, through relay 170, and also activates sensitive edge 172. Under ordinary conditions, when the door is closing, limit switch 174 disables sensitive edge 172 when the door is approximately 1.27 cm. (½ inch) from fully closed to allow full door closing. Limit switch 174 is a single pole, single throw normally closed switch. It should also be noted that when limit switch 168 is tripped, door open pilot light 176 goes on.

If there is an obstruction in the doorway as the door closes, sensitive edge 172 will contact it and reverse the door direction, powering the door to the full open position. This is done through relay 178 which disrupts the close door circuit when the sensitive edge 172 is activitated and does not allow the close door cycle to activate until the door is fully open. When activated by sensitive edge 172, relay 178 accomplishes four functions. First, pole A acts as a holding circuit to maintain relay coil energy until the door is fully opened. Second, pole B directs power to the high-pressure door open valve 120 and sounds buzzer 180 to alert the vehicle operator. Third, pole C switches door control valve 118 from the close position to the open position. Finally, pole D disables the door close button 164.

Emergency door open switch 182 located near the door is powered from the vehicle battery. Actuation of this switch cycles valve 118 and applies high-pressure air to the open end of cylinder 26. External door control switch 184 allows operation of the door from outside the bus. This switch is powered directly by the battery as is relay 170.

The embodiment shown in FIGS. 3-6 provides a reliable, smoothly working, door opening and closing mechanism. Ball bushing assemblies 40 and 46 move smoothly along linear bearing means 28 and 48, respectively. Due to the fact that the lower suspension system bears most of the weight of the door, approximately eighty percent, and the upper suspension system acts primarily as a guide, bearing only about twenty percent of the weight of the door, and that twenty percent load actually being an outwardly directed torque rather than a downward moment of force, the system of the invention is able to withstand the rough treatment which these vehicles are ordinarily given. It should also be noted that the vehicle frame, both top and bottom portions, is additionally braced to withstand a variety of stresses encountered in driving along an often uneven roadway, and to maintain the vehicle perfectly square. Thus, linear bearing means 28 and 48 are maintained perfectly parallel to each other.

Figure 10:
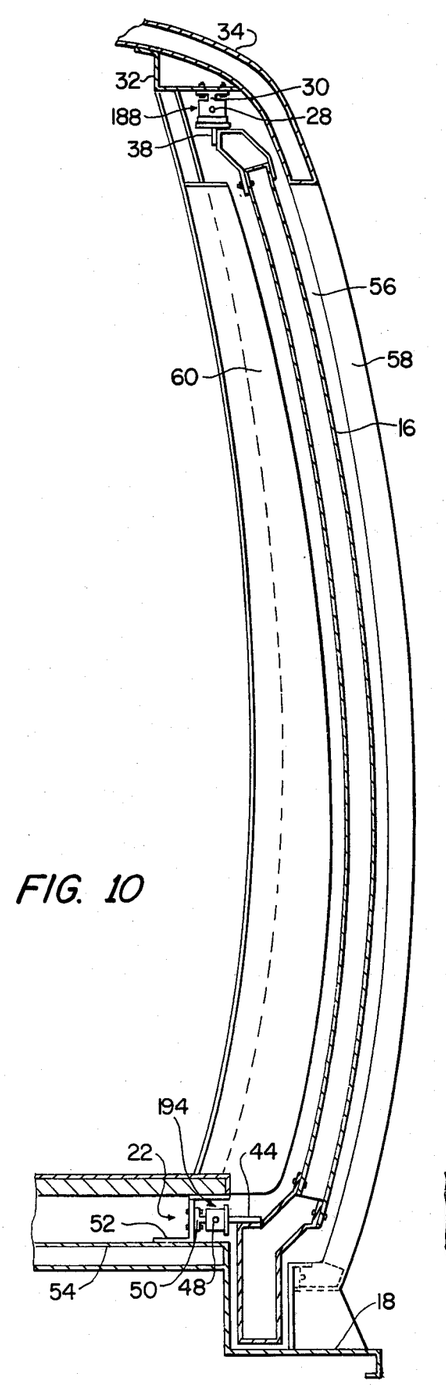
FIG. 10 is a vertical sectional view taken on the line 3—3 of FIG. 2, but showing an alternate embodiment of the door mounting arrangement.
Figure 11:
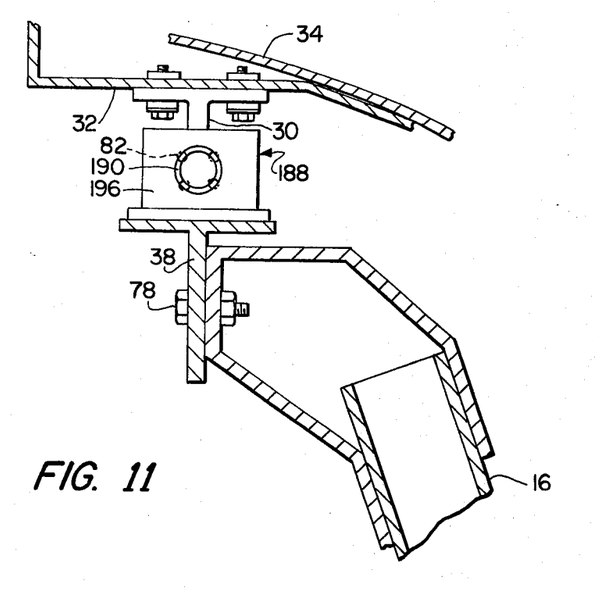
FIG. 11 is a sectional view of the upper mounting of the door of FIG. 10 in slightly enlarged scale.
Figure 12:
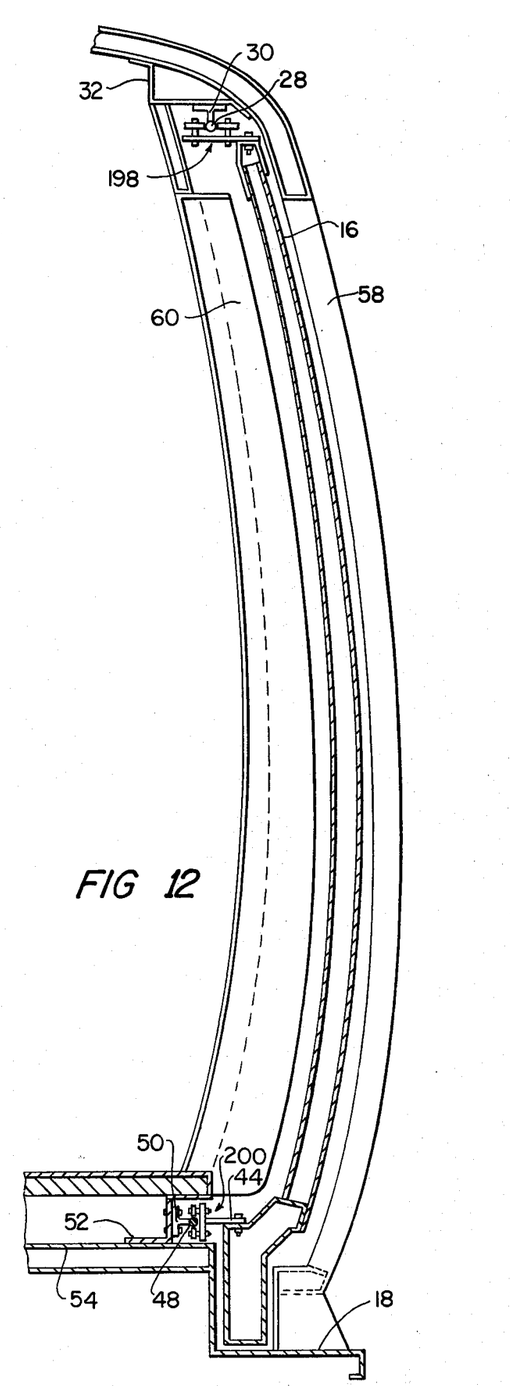
FIG. 12 is a vertical sectional view taken on the line 3—3 of FIG. 2, but showing another alternate embodiment of the door mounting arrangement.

But, due to the nature of the C-shaped, or split, ball bushing 40 and 46, in some climates which are particularly dusty or humid, dust or moisture can enter the bushing 74 and cause wear of the ball bearings 82. Accordingly, in a second embodiment which is depicted in FIGS. 10 and 11, a ball bushing assembly 188 is used which completely encircles, or encapsulates, linear bearing 28. Similarly, a lower ball bushing assembly 194 is used to completely surround, or encapsulate, lower linear bearing 48. Ball bushing assembly 188 comprises a hard rubber ball bushing 190 in which ball bearings 82 ride. This ball bearing-bushing assembly is held securely in mounting block 196. The obvious difference between this ball bushing assembly 188 and the ball bushing assembly 40 of the first embodiment is that ball bushing assembly 188 completely surrounds linear bearing 28.

Obviously, with ball bushing assembly 188 completely surrounding linear bearing 28, linear bearing 28 cannot be suspended from upper track support 32 by as many supporting brackets 30 since they would interfere with the motion of ball bushings 188 along linear bearing 28. It has been found that linear bearing 28 can be suspended at its ends only by brackets 30 with such suspending brackets 30 being made somewhat larger than those which would be used in connection with the first embodiment using the C-shaped ball bushing assembly. This is shown in phantom at 192 in FIG. 6. Then, whereas in the first embodiment using the C-shaped ball bushing assembly 40, at least two ball bushing assemblies 40 are used, one at the forward edge of the door and one at the rearward edge, with others optionally used at other locations along the top of the door, in this second embodiment using ball bushing 188 which completely surrounds linear bearing 28, only one or two ball bushing assemblies 188 are used. If one is used, it is located at the center of the top edge of the door and is made wider than would be necessary when more than one ball bushing is used. If two ball bushings 188 are used, they are equally spaced to either side of the longitudinal axis of the door, perhaps about twelve to fifteen centimeters (about 5–6 inches) on either side of said longitudinal axis.

While the foregoing description of the ball bushing and suspension system used in this second embodiment has been by reference to the upper suspension system, it should be distinctly understood that the same comments apply equally to the lower suspension system. Again, as with the first embodiment, it is the lower suspension system that bears most of the weight of the door and the upper suspension system that acts primarily as a guide. As with the upper suspension system, the lower suspension system would have a single mount 50 at each end of rod 48 and either a pair of ball bushing assemblies 194 spaced apart equidistant on either side of the longitudinal axis of the door, or a single double-or triple-width ball bushing assembly 194 centered on the longitudinal axis of the door assuming the door is relatively uniform in weight distribution. If it is necessary, to maintain the balance of the door, ball bushing assembly 194 could be shifted to one side or the other, or weights placed in appropriate places in the door to equalize the balance about the longitudinal axis. Of course, this would be apparent to, and easily accomplished by, one skilled in the art.

Figure 13:
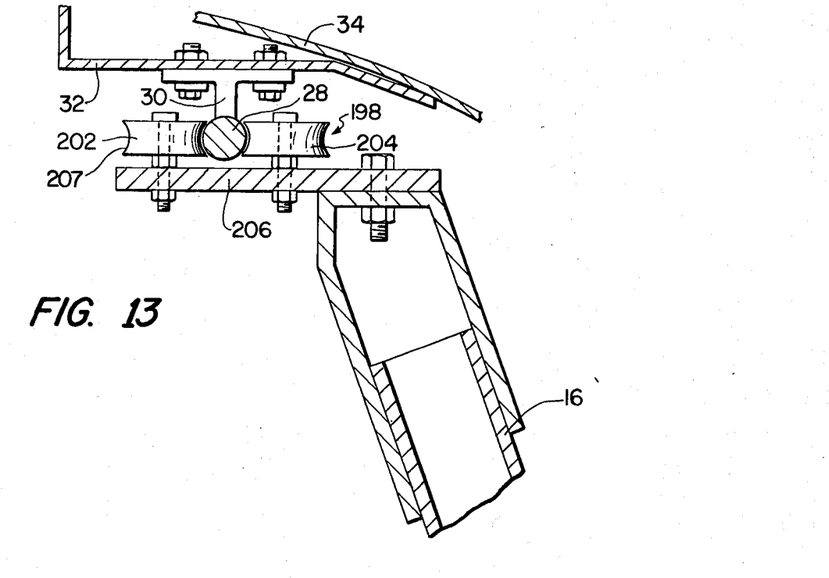
FIG. 13 is a sectional view of the upper mounting of the door of FIG. 12 in slightly enlarged scale.
Figure 14:
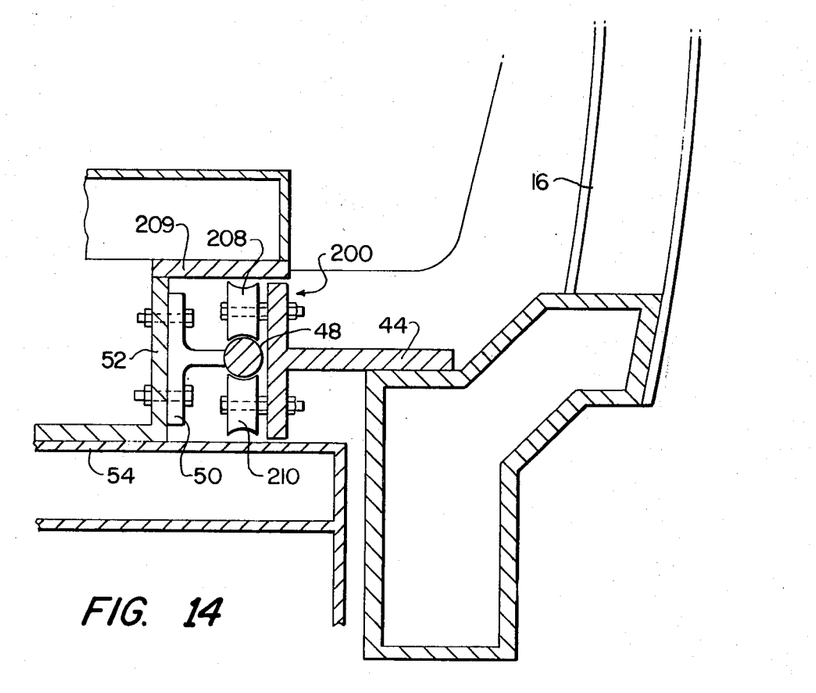
FIG. 14 is a sectional view of the lower mounting of the door of FIG. 12 in slightly enlarged scale.

Turning now to FIGS. 12–15, there is shown a third preferred embodiment of the suspension system using a system of wheels instead of the ball bushings. In this embodiment, the same linear bearing rod 28 mounted on suspending T-shaped brackets 30 is used. But, instead of ball bushing assembly 40 or 188, a wheel assembly 198 is used to mount the door to the bearing rod 28. Wheel assembly 198 comprises bracket 206 which is affixed to the top of door 16 and a pair of wheels 202 and 204 which ride on a sealed ball bearing hub mounted to bracket 206. As illustrated in FIG. 13, the wheels have an arcuate bearing surface 207 which fit around linear bearing rod 28. As will be appreciated, linear bearing rod 28 is circular in cross-section and arcuate bearing surface 207 is of a size and shape to mate with the outer circular surface of rod 28 without any interference from mounting bracket 30.

Figure 15:
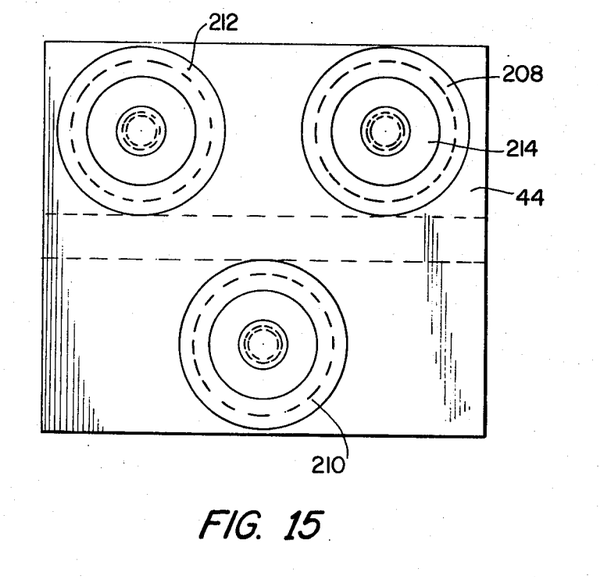
FIG. 15 is an elevational view of the lower bearing assemby of FIG. 14.

While, as with the previous embodiments, the lower suspension system is essentially the same as the upper suspension system, there is a single difference. Specifically, this difference is the use of three bearing wheels 208, 210 and 212 as shown in FIG. 15. Since it is the lower suspension that bears most of the weight, the use of two upper wheels 208 and 212 provides for better weight distribution of the door and, therefore, smoother and more efficient movement. Lower wheel 210 acts to keep the wheels from slipping off rod 48, acts as a guide, and also provides smoother operation. It will be seen, by reference to wheel 208, for example, that it is mounted on hub 214 which comprises a sealed ball bearing system which is commercially available. As with previous embodiments, T-shaped mounting bracket 50 is fixed to Z-shaped bracket 52 which is, in turn, fixed to the lower frame 54 of the vehicle, and under the interior floor 209. Wheels 208, 210 and 212 are mounted on a T-shaped bracket 44 as in the previous embodiments.

Figure 16:
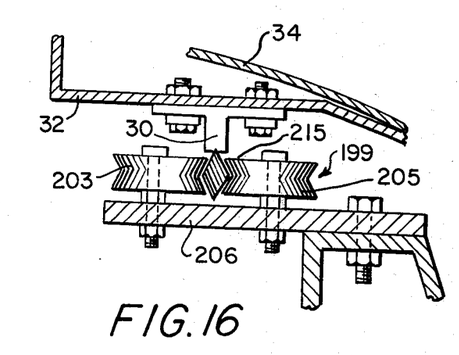
FIG. 16 is a sectional view of the upper mounting of the door showing another embodiment.

While the wheels 202, 204, 208, 210 and 212, have been described in this preferred embodiment as having arcuate bearing surface 207 to mate with linear bearing rod 28, one skilled in the art will appreciate that these wheels could be V-shaped, like typical pulley wheels, and would then mate with a linear bearing rod whose cross-section would be rhombic in shape. This is shown in FIGS. 16 and 17 where upper wheels 203 and 205 of assembly 199 are V-shaped and linear bearing rod 215 is rhombic, and wheels 209 and 211 of assembly 201 are V-shaped and linear bearing rod 217 is rhombic. The arcuate bearing surface to mate with a circular rod is preferred since the circular rod is used in the other embodiments and the wheel mounting arrangement 198 and 200 could merely replace the other ball bushing mounting arrangements without any modification of the remaining suspension system.

It should be apparent from the foregoing detailed description that the objects set forth hereinabove have been successfully achieved. Moreover, while there is shown and described a present preferred embodiment of the invention, it is to be distinctly understood that the invention is not limited thereto but may be otherwise variously embodied and practiced within the scope of the following claims. Accordingly,

I claim:

1. In combination, a mass transit vehicle having a sliding door, comprising upper track means suspended downwardly and resiliently mounted on the upper frame of said vehicle, lower track means extending outwardly and rigidly mounted on the lower frame of said vehicle, lower suspending means mounted on said door and slidingly cooperating with said lower track means, upper guide means mounted on said door and slidingly cooperating with said upper track means, and means for causing said door to move between an open and a closed position along said track means, each of said track means comprising linear bearing rod means affixed to a plurality of spaced apart mounting blocks which, in turn, are secured to said vehicle such that said linear bearing means are essentially parallel to the longitudinal axis of said vehicle, said upper track means comprising an upper track support fixed to the upper frame of said vehicle in a horizontal plane and upper mounting blocks suspended from, and resiliently mounted to, said upper track support, and said lower track means comprising a lower track support fixed to the lower frame of said vehicle in a vertical plane and lower mounting blocks extending outwardly from, and rigidly mounted to, said lower track support.

2. The combination of claim 1, wherein said door moving means comprises a pneumatic cylinder connected to said door through linkage means, means for supplying compressed air to said cylinder, and control means for said cylinder.

3. The combination of claim 1, wherein each of said upper guide means and lower suspending means comprises a plurality of spaced apart C-shaped ball bushings attached to said door and said bearing rod is circular in cross-section.

4. The combination of claim 3, comprising from 3 to 6 of each of said upper and lower mounting blocks and from 3 to 6 of each of said upper and lower C-shaped ball bushings.

5. The combination of claim 1, comprising a pair of each of said upper and lower mounting blocks located one at each end of said upper and lower bearing rod means, respectively.

6. The combination of claim 5, wherein each of said upper guide means and lower suspending means comprises a plurality of spaced apart O-shaped ball bushings attached to each door and said bearing rod is circular in cross-section.

7. The combination of claim 6, comprising from 1 to 2 of said upper and lower O-shaped ball bushings, respectively centered on the longitudinal axis of said door.

8. The combination of claim 1, wherein each of said upper guide means and lower suspending means comprises a plurality of rotating wheels having an outer bearing surface of a size and shape to mate with, and partially surround, said bearing rod.

9. The combination of claim 8, wherein said bearing surface of said wheels is arcuate and said bearing rod is circular in cross-section.

10. The combination of claim 8, wherein said bearing surface of said wheels is V-shaped and said rod is rhombic in cross-section.

11. The combination of claim 8, wherein each of said upper guide means comprises a pair of wheels mounted in opposition to receive said upper bearing rod between them, and said each of lower suspending means comprises a pair of upper wheels and a single lower wheel centered below and between said pair of upper wheels such that the axes of said upper and lower wheels form the apices of an equilateral triangle, said upper and lower wheels being spaced apart sufficiently to receive said lower bearing rod between them.

12. The combination of claim 8, comprising a pair of each of said upper and lower mounting blocks located one at each end of said upper and lower bearing rod means, respectively.

13. The combination of claim 1, wherein said lower suspending means support at least about 80% of the weight of said door and said upper guide means support at least a portion, but no more than about 20%, of the weight of said door.

14. A mounting system for a sliding door in a mass transit vehicle comprising upper and lower track means, upper guide means, and lower suspension means; said upper track means comprising an upper track support fixed to the upper frame of said vehicle in a horizontal plane, a plurality of spaced apart upper mounting blocks suspended from, and resiliently mounted to, said upper track support, and upper linear bearing means affixed to said upper mounting blocks; said lower track means comprising a lower track support fixed to the lower frame of said vehicle in a vertical plane, a plurality of spaced apart lower mounting blocks extending outwardly from, and rigidly mounted to, said lower track support, and lower linear bearing means affixed to said lower mounting blocks; said upper and lower mounting blocks being arranged such that said upper and lower linear bearing means are essentially parallel to the longitudinal axis of said vehicle; said upper guide means and said lower suspension means being attached to the upper and lower frame of said door, respectively, and being slidingly cooperable with said upper and lower linear bearings, respectively.

15. The system of claim 14, wherein each of said upper guide means and lower suspending means comprises a plurality of spaced apart C-shaped ball bushings attached to said door and said bearing rod is circular in cross-section.

16. The system of claim 15, comprising from 3 to 6 of each of said upper and lower mounting blocks and from 3 to 6 of each of said upper and lower C-shaped ball bushings.

17. The system of claim 14, comprising a pair of each of said upper and lower mounting blocks located one at each end of said upper and lower bearing rod means, respectively.

18. The system of claim 17, wherein each of said upper guide means and lower suspending means comprises a plurality of spaced apart O-shaped ball bushings attached to each door and said bearing rod is circular in cross-section.

19. The system of claim 18, comprising from 1 to 2 of said upper and lower O-shaped ball bushings, respectively centered on the longitudinal axis of said door.

20. The system of claim 14, wherein each of said upper guide means and lower suspending means comprises a plurality of rotating wheels having an outer bearing surface of a size and shape to mate with, and partially surround, said bearing rod.

21. The system of claim 20, wherein said bearing surface of said wheels is arcuate and said bearing rod is circular in cross-section.

22. The system of claim 20, wherein said bearing surface of said wheels is V-shaped and said rod is rhombic in cross-section.

23. The system of claim 20, wherein each of said upper guide means comprises a pair of wheels mounted in opposition to receive said upper bearing rod between them, and said each of lower suspending means comprises a pair of upper wheels and a single lower wheel centered below and between said pair of upper wheels such that the axes of said upper and lower wheels form the apices of an equilateral triangle, said upper and lower wheels being spaced apart sufficiently to receive said lower bearing rod between them.

24. The combination of claim 20, comprising a pair of each of said upper and lower mounting blocks located one at each end of said upper and lower bearing rod means, respectively.

25. The combination of claim 14, wherein said lower suspending means support at least about 80% of the weight of said door and said upper guide means support at least a portion, but no more than about 20% of the weight of said door.

* * * * *